Mar. 5, 1929.                J. C. McCUNE                1,703,893
                          FLUID PRESSURE BRAKE
                          Filed Dec. 7, 1927
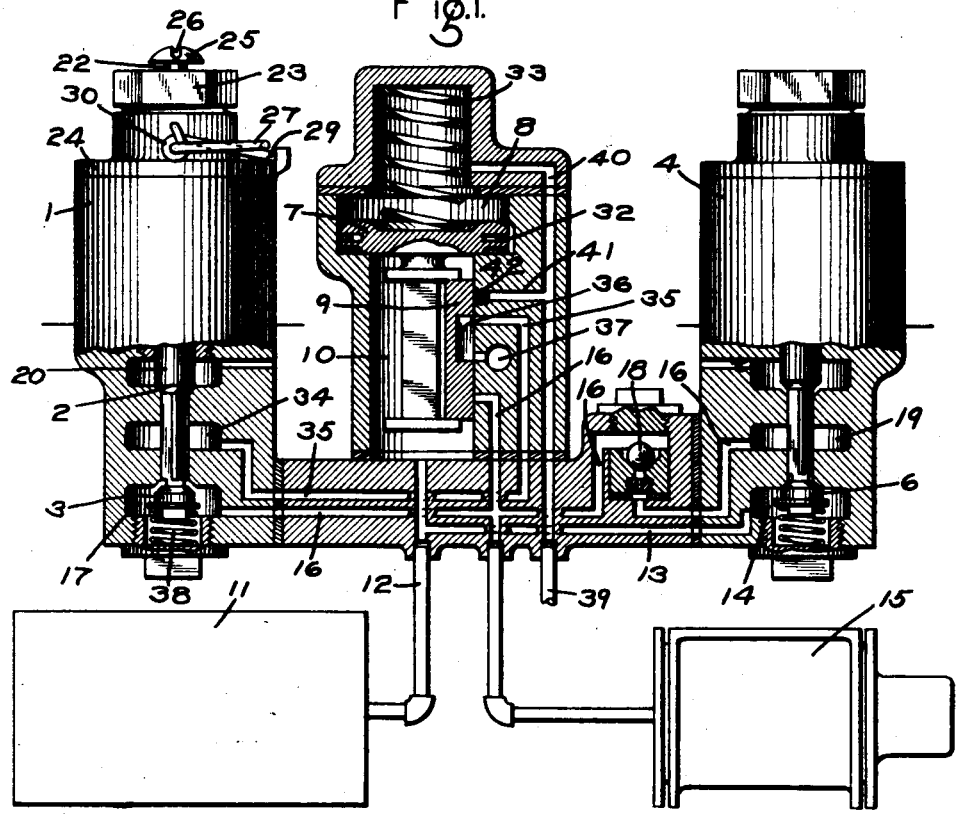
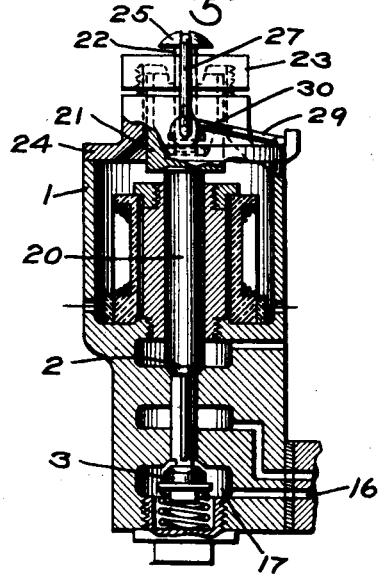
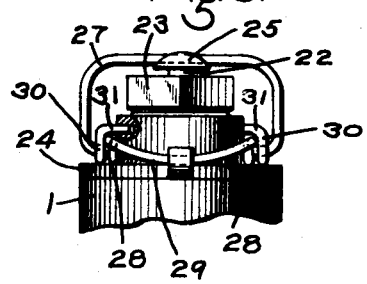
INVENTOR
JOSEPH C. McCUNE
BY Wm. M. Cady
ATTORNEY Patented Mar. 5, 1929.

1,703,893

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed December 7, 1927. Serial No. 238,251.

This invention relates to an electropneumatic brake of the type shown in my prior pending application, Serial No. 235,450, filed November 25, 1927, (Case 2546).

In the above application, a manually operable valve is provided for effecting the release of the brakes in case the electrically operated release controlling means should fail.

The principal object of my invention is to provide means for effecting the release of the brakes in case of failure to operate electrically, by manually operating the electrically controlled release valve.

In the accompanying drawing; Fig. 1 is a sectional view of the electro-pneumatic brake portion of a brake equipment, showing my invention applied thereto; Fig. 2 a sectional view of the electro-pneumatic release valve device shown in Fig. 1; and Fig. 3 a fragmentary view, showing the valve operating means of Fig. 2 in a different plane.

The apparatus shown in Fig. 1 comprises a release magnet valve device having an electro-magnet 1 and double beat valves 2 and 3 adapted to be controlled by said magnet, an application magnet valve device comprising a magnet 4 and double beat valves 5 and 6 adapted to be controlled by the magnet 4, and an emergency valve device comprising a piston 7 contained in piston chamber 8 and a slide valve 9, contained in valve chamber 10 and adapted to be operated by said piston.

A main reservoir 11 or other source of fluid under pressure is connected through pipe 12 with valve chamber 10 and also through passage 13 with valve chamber 14. The brake cylinder 15 is connected to a passage 16 leading to the seat of slide valve 9 and having a branch leading to valve chamber 17 and also a branch, containing a check valve 18 and leading to a chamber 19 intermediate the valves 5 and 6.

The valve 2 is carried by a stem 20 which extends through a central bore of the magnet 1 and is provided at its upper end with an armature portion 21. Secured to the portion 21 is a pin 22 which extends upwardly through a bore in a nut 23 having screwthreaded engagement with the magnet cover plate 24, in which the armature portion 21 reciprocates. The pin 22 is provided at its outer end with a head 25 having a groove 26 cut therein.

For operating the pin 22 a wire bail 27 is provided, which is adapted to engage in the groove 26 and having inturned ends 28. A handle portion 29 of wire having formed therein loops 30, into the eyes of which the ends 28 of the bail 27 extend. The ends 31 of the handle portion 29 extend into radial bores provided in the cover plate 24.

In operation, fluid under pressure from the main reservoir 11 is supplied to valve chamber 10 of the emergency valve device and fluid equalizes from valve chamber 10 through a feed groove 32 into piston chamber 8, thus permitting the spring 33 to maintain the piston 7 in release position, as shown in the drawing.

In release, the release magnet 1 is energized, so that the valve 2 is held seated and the valve 3 is unseated, so that the brake cylinder 15 is connected to the exhaust through passage 16, past the open valve 3, chamber 34, passage 35, cavity 36 in slide valve 9 and exhaust port 37.

When it is desired to effect a service application of the brakes, the release magnet 1 is deenergized, while the service magnet 4 is energized. The deenergization of maget 1 permits the spring 38 to operate so as to seat the valve 3 and thus cut off the exhaust communication from the brake cylinder 15. The energization of magnet 4 causes the valve 5 to be seated and the valve 6 to be unseated, so that fluid under pressure is supplied from the main reservoir 11 to the brake cylinder 15 through passage 13, valve chamber 14, past the open valve 6, chamber 19, and through passage 16, past the check valve 18, to the brake cylinder.

A safety control pipe 39 is connected through passage 40 with piston chamber 8 of the emergency valve device and when the pressure in said pipe is reduced, the piston 7 moves out to emergency position, in which slide valve 9 uncovers passage 16, so that fluid under pressure is supplied to the brake cylinder from valve chamber 10 and the main reservoir 11, to effect an emergency application of the brakes. In an emergency application of the brakes, the release magnet 1 is deenergized, so that valve 3 is seated.

To release after an emergency application of the brakes, the release magnet 1 is deenergized and with the slide valve 9 in emergency position, cavity 36 connects passage 35, with a passage 41, leading to passage 40. Passage 16 being open in emergency position of slide valve 9 to valve chamber 10, fluid from the main reservoir 11 is supplied to piston chamber 8, through passage 16, past the open valve 3, chamber 34, passage 35, cavity 36, and passages 41 and 40.

The piston 7 is then shifted to release position, in which passage 35 and therefore the brake cylinder is connected to exhaust port 37.

If the service application magnet should fail due to the magnet coil burning out, or a wire breaking, the brakes may be applied in emergency by venting fluid from the control pipe 39 and from piston chamber 8 of the emergency valve device and then to release the brakes, the bail 27 and the handle 29 are turned up from the position shown in Fig. 1, so that the bail is in alinement with the groove 26 in the head 25. The handle 29 is then turned down, while holding the bail over the groove 26, which causes a downward movement of the bail, due to the ends 28 engaging in the loops 30 of the handle, so that the bail enters into the groove 26 and the pin 22 is forced downwardly, pressing the valve 2 to its seat, due to the corresponding downward movement of the armature portion 21 and the stem 20. The valve 3 is unseated by this movement, so that the release movement of the piston 7 is effected in the same manner as hereinbefore described in effecting the release electrically.

The apparatus may be operated in the above manner, so long as the electric brake control remains inoperative, by allowing the bail 27 to remain in the position holding the valve 3 open.

A choke plug having a restricted port 42 is disposed in passage 41, so that when the valve 3 is maintained open by the bail 27 and an emergency application is effected by reducing the fluid pressure in the control pipe 39 and in piston chamber 8, the flow of fluid from the main reservoir through the restricted port 42 to passage 40, with slide valve 9 in emergency position, will not be sufficient to charge the piston chamber 8 with fluid pressure so as to effect the release movement of the piston, so long as the pipe 39 is vented to the atmosphere.

While one illustrative embodiment of the invention has been described in detail, it is not my intention to limit its scope to that embodiment or otherwise than by the terms of the appended claims.

Having now described by invention, what I claim as new and desire to secure by Letters Patent, is:—

1. In an electro-pneumatic brake, the combination with electrically controlled means for effecting the release of the brakes, of means for manually operating said electrically controlled means for also effecting the release of the brakes.

2. In an electro-pneumatic brake, the combination with electrically controlled means for effecting the release of the brakes, of means for manually operating said electrically controlled means for also effecting the release of the brakes and for holding said electrically controlled means in release position.

3. In an electro-pneumatic brake, the combination with electrically controlled means for effecting the release of the brakes, of means for manually operating said electrically controlled means for also effecting the release of the brakes and for locking said electrically controlled means in release position.

4. In an electro-pneumatic brake, the combination with a valve device operated upon a reduction in fluid pressure for effecting an application of the brakes, of electrically controlled means for controlling the release of the brakes and for supplying fluid under pressure to said valve device, and means for manually operating said electrically controlled means in case of failure of current supply.

5. In an electro-pneumatic brake, the combination with a brake cylinder, of a valve for controlling communication through which fluid under pressure is released from the brake cylinder, a magnet for operating said valve, and means for manually operating said valve.

6. In an electro-pneumatic brake, the combination with a brake cylinder, of a valve for controlling communication through which fluid under pressure is released from the brake cylinder, a magnet for operating said valve, a stem for also operating said valve, a bail for operating said stem, and a handle device for operating said bail.

7. In an electro-pneumatic brake, the combination with a brake cylinder, of a valve device operated upon a reduction in fluid under pressure for supplying fluid under pressure to the brake cylinder and upon an increase in fluid under pressure for connecting the brake cylinder to the exhaust, electrically controlled means for controlling communication through which the brake cylinder is connected to the exhaust and communication through which fluid under pressure is supplied to said valve device, and means for manually operating said electrically controlled means in case of failure of electric current.

In testimony whereof I have hereunto set my hand.

JOSEPH C. McCUNE.